(12) United States Patent
Roberts, Jr.

(10) Patent No.: US 8,596,027 B2
(45) Date of Patent: Dec. 3, 2013

(54) PACKAGING COMPONENT, METHOD OF USE, AND METHOD OF MANUFACTURE

(76) Inventor: Richard W. Roberts, Jr., Tecumseh, MI (US)

(*) Notice: Subject to any disclaimer, the term of this patent is extended or adjusted under 35 U.S.C. 154(b) by 266 days.

(21) Appl. No.: 13/005,190

(22) Filed: Jan. 12, 2011

(65) Prior Publication Data

US 2012/0102884 A1 May 3, 2012

(51) Int. Cl.
*B65B 63/02* (2006.01)
(52) U.S. Cl.
USPC .............................................. 53/436; 53/523
(58) Field of Classification Search
USPC .................... 53/436, 523, 526, 528
See application file for complete search history.

(56) References Cited

U.S. PATENT DOCUMENTS

| | | | |
|---|---|---|---|
| 776,342 A | 11/1904 | McCormick | |
| 1,588,778 A | 6/1926 | Sorensen | |
| 3,062,337 A | 11/1962 | Zittle | |
| 3,111,787 A | 11/1963 | Chamberlain | |
| 3,468,097 A | 9/1969 | Mack | |
| 3,598,312 A | 8/1971 | Hamilton | |
| 3,745,998 A * | 7/1973 | Rose | 602/6 |
| 3,813,040 A | 5/1974 | Heinemeyer | |
| 4,651,494 A | 3/1987 | Van Wagoner | |
| 4,680,909 A | 7/1987 | Stewart | |
| 4,840,973 A | 6/1989 | Kuwabara et al. | |
| 5,018,329 A | 5/1991 | Hasan et al. | |
| 5,055,350 A | 10/1991 | Neefe | |
| 5,366,674 A | 11/1994 | Hattori et al. | |
| 5,665,285 A | 9/1997 | Hattori et al. | |
| 5,713,518 A | 2/1998 | Fox | |
| 5,866,224 A | 2/1999 | Ang et al. | |
| 6,179,215 B1 | 1/2001 | Shea | |
| 6,230,981 B1 | 5/2001 | Hill et al. | |
| 6,375,892 B2 | 4/2002 | Thomas | |
| 6,605,343 B1 | 8/2003 | Motoi et al. | |
| 6,931,809 B1 | 8/2005 | Brown et al. | |
| 7,219,479 B2 | 5/2007 | Durning et al. | |
| 7,358,280 B2 | 4/2008 | Berghmans et al. | |
| 7,931,210 B1 | 4/2011 | Pike et al. | |
| 7,950,592 B2 | 5/2011 | Yuan | |
| 2002/0124531 A1* | 9/2002 | Mossbeck et al. | 53/430 |
| 2003/0224675 A1 | 12/2003 | Yeh | |
| 2004/0176001 A1 | 9/2004 | Yeh | |

(Continued)

FOREIGN PATENT DOCUMENTS

| | | |
|---|---|---|
| JP | 58213028 A | 12/1983 |
| JP | 59155443 A | 9/1984 |
| JP | 59210954 A | 11/1984 |
| JP | 60090744 A | 5/1985 |

OTHER PUBLICATIONS

Product Information: "Arplank, Expanded Bead Foam Packaging Materials", www.jsp.com, pp. 1-21.
Manning, A., Choosing Plastic, www.mmh.com, Oct. 2008, pp. 1-2.

(Continued)

*Primary Examiner* — Hemant M Desai
(74) *Attorney, Agent, or Firm* — Brooks Kushman P.C.

(57) ABSTRACT

A packaging component for use with an article includes a panel having a first shell with a first surface facing the exterior of the package and a first opposing, spaced apart inward-facing surface. The first shell defines a first cavity. The panel further includes a first core situated in the first cavity wherein the first core includes a plurality of in-situ expanded polymer particles.

21 Claims, 9 Drawing Sheets

(56) References Cited

U.S. PATENT DOCUMENTS

| | | |
|---|---|---|
| 2004/0232254 A1 | 11/2004 | Kowalski |
| 2005/0001048 A1 | 1/2005 | Skoblenick |
| 2005/0101201 A1 | 5/2005 | Yeh |
| 2005/0188637 A1 | 9/2005 | Yeh |
| 2005/0215138 A1 | 9/2005 | Yeh |
| 2005/0272323 A1 | 12/2005 | Yeh |
| 2006/0030467 A1 | 2/2006 | Mellott |
| 2006/0105650 A1* | 5/2006 | Yeh ................................ 441/65 |
| 2006/0110993 A1 | 5/2006 | Yeh |
| 2006/0131437 A1 | 6/2006 | Thiagarajan et al. |
| 2006/0134401 A1 | 6/2006 | Yeh |
| 2006/0223897 A1 | 10/2006 | Sasaki |
| 2007/0015421 A1 | 1/2007 | Yeh |
| 2007/0040293 A1 | 2/2007 | Lane et al. |
| 2007/0160798 A1 | 7/2007 | Yeh |
| 2008/0081153 A1 | 4/2008 | Yeh |
| 2008/0083835 A1 | 4/2008 | Girardi et al. |
| 2008/0125502 A1 | 5/2008 | Reichman et al. |
| 2008/0142611 A1 | 6/2008 | Scobie |
| 2008/0166539 A1 | 7/2008 | Yeh |
| 2008/0242169 A1 | 10/2008 | Yeh |
| 2008/0305304 A1 | 12/2008 | Yeh |
| 2010/0028654 A1 | 2/2010 | Takase |
| 2012/0102884 A1 | 5/2012 | Roberts, Jr. |
| 2012/0104110 A1 | 5/2012 | Roberts, Jr. |

OTHER PUBLICATIONS

Specter, S.P., The Rise of the Plastic Pallet, Modern Materials Handling, Sep. 2009, pp. 1-4.

* cited by examiner

PACKAGING COMPONENT, METHOD OF USE, AND METHOD OF MANUFACTURE

CROSS-REFERENCE TO RELATED APPLICATIONS

This application is co-pending with U.S. application Ser. No. 12/913,132 filed Oct. 27, 2010, which is incorporated by reference herein.]

TECHNICAL FIELD

One or more embodiments of the present invention relate to a packaging component, a method of use and a method of manufacture of same.

BACKGROUND

Transportation of products from manufacturers to customers is most economical when a product is as dense as possible. Some products, such as mattress springs, may be compressed to increase the density for shipping, and then uncompressed at the customers' locations.

SUMMARY

In at least one embodiment, a packaging component for an article includes a first panel. The first panel has a first shell, which has a first surface facing the exterior of the shell relative to the article. The first shell also has a first opposing, spaced-apart inward-facing surface and defines a first cavity. Positioned within the first cavity is a first core including a plurality of in-situ expanded polymer particles.

In another embodiment, a packaging component for use with an article includes a first panel. The first panel includes a first shell defining a first cavity including a first core situated in the first cavity. The first core includes a plurality of in-situ expanded polymer particles. The particles have an apparent bulk density ranging from 1 lb. per cubic ft. to 20 lbs. per cubic ft.

In yet another embodiment, a method for manufacturing a packaging component recites the step of providing a plastic composition shell in an enclosed mold cavity in the shape of an elongated member. The elongated member forms an elongated tubular plastic shell having a longitudinal axis. At least one substantially planar shell is draw-formed from the tubular plastic shell using a closed mold having a closing axis substantially transverse to the longitudinal axis. The planar shell has at least one aperture and defines a cavity. The cavity is filled with expandable polymer particles by forming at least one fill port in the planar shell and filling the cavity with expandable polymer particles. The expandable polymer particles are expanded using an injection of a heating medium through a plurality of heating ports in the wall of the shell. The shell is constrained to limit expansion caused by the expanding of the polymer particles until the packaging component has cooled sufficiently to limit further expansion. The packaging component is then released from the mold cavity.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except where expressly indicated, all numerical quantities in the description and claims, indicated amounts of material or conditions of reaction and/or use are to be understood as modified by the word "about" in describing the broadest scope of the present invention. Practice within the numerical limits stated should be desired and independently embodied. Ranges of numerical limits may be independently selected from data provided in the tables and description. The description of the group or class of materials as suitable for the purpose in connection with the present invention implies that the mixtures of any two or more of the members of the group or classes are suitable. The description of constituents in chemical terms refers to the constituents at the time of addition to any combination specified in the description and does not necessarily preclude chemical interaction among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same techniques previously or later referenced for the same property. Also, unless expressly stated to the contrary, percentage, "parts of," and ratio values are by weight, and the term "polymer" includes "oligomer," "co-polymer," "terpolymer," "pre-polymer," and the like.

This application is co-pending with application Ser. No. 12/913,132 which is incorporated by reference.

Figure 1A:
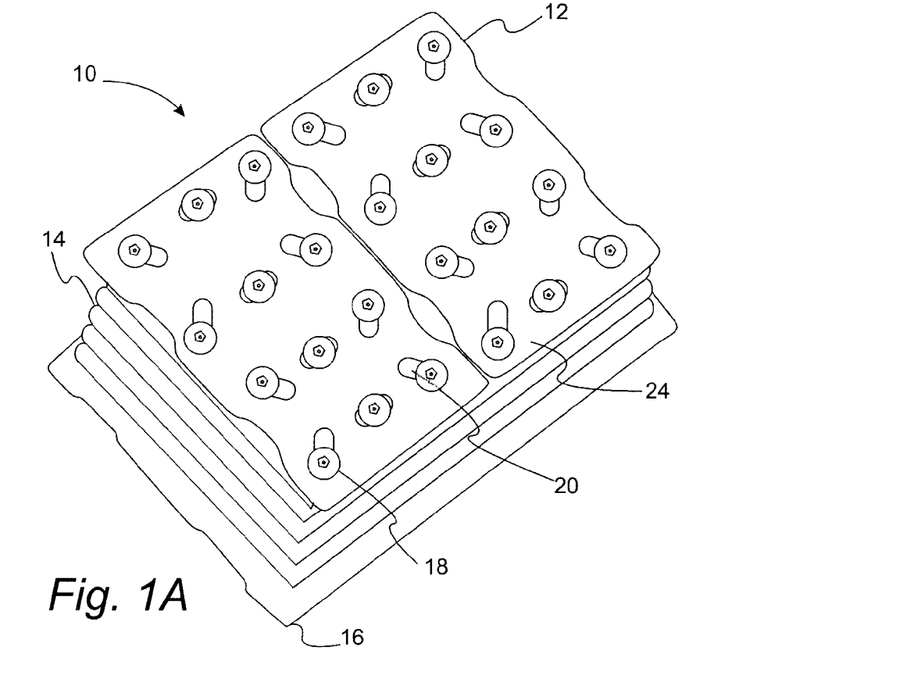
FIG. 1a schematically illustrates a packaging component and product in an uncompressed state according to at least one embodiment.
Figure 1B:
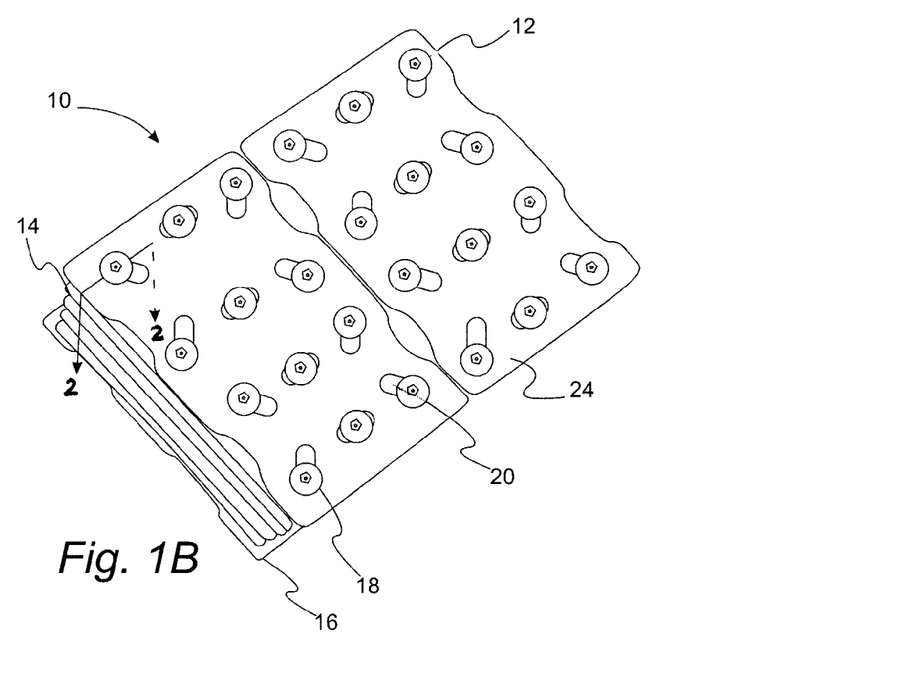
FIG. 1b schematically illustrates a packaging component and product in a compressed state according to at least one embodiment.

FIG. 1a schematically illustrates a packaging component and product in an uncompressed state according to at least one embodiment. A package 10 includes a retainer panel 12 and a quantity of compressible items to be packaged, such as a spring set 14 for a bed. FIG. 1b schematically illustrates a package 10 in a compressed state where the retainer panel 12 has been used to compress the spring set 14, the retainer panel 12 is then connected to a second retainer panel 16 using a tie bar 18 passing through the spring system and being connected to the second retainer panel 16. Tie bar 18 is positioned in an embossment 20 that is at least on an exterior surface 24 of retainer panel 12. The exterior surface 24 is the surface not directly contacting the spring set 14. When in use the tie bar 18 squeezes the spring set 14 in order to compress it. The tie bar 18 is placed in tension at that squeezing time period.

Figure 2:
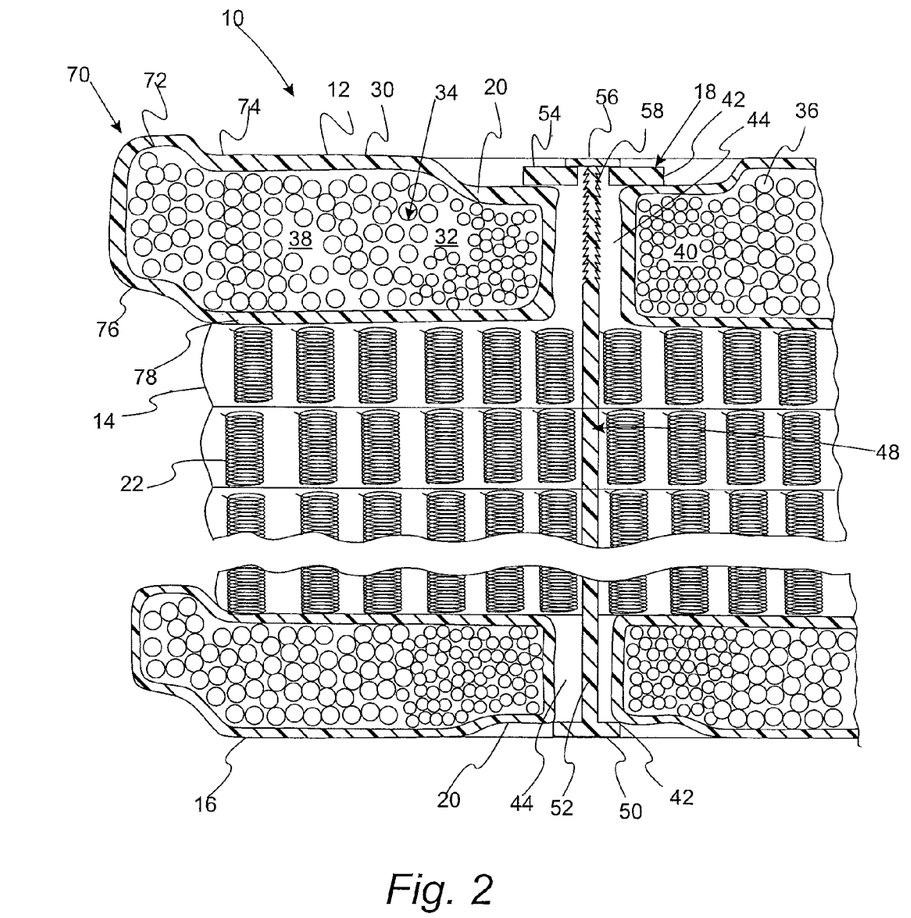
FIG. 2 schematically illustrates a fragmentary cross-sectional view of a packaging component along axis 2-2 of FIG. 1b according to at least one embodiment.

Turning now to FIG. 2, a package 10 in a relatively compressed state along axis 2-2 of FIG. 1b is illustrated according to at least one embodiment. Retainer board 12 comprises a wall 30 which defines a cavity 32 into which a core 34 is placed. Core 34 includes a plurality of expanded polymer beads 36 which substantially fill the cavity 32. Core 34 has two density zones 38 and 40.

Tie bar 18 includes a base 50 and an elongated shaft 52 connected to base 50. Base 50 rests on surface 42 of wall 30 while shaft 52 passes through an aperture 44 in the embossment 20 of retainer board 16. Shaft 52 passes through the spring sets 14. Shaft 52 passes through aperture 42 in the embossment 20 of retainer board 12. A washer 44 contacts surface 42 of panel 12 and supports a nut 56. A threaded section 58 of shaft 52 passes through washer 54 and engages nut 56 to securely position washer 44 on panel 12. The assembled tie bar 18 including base 50, shaft 52, washer 44 and nut 56 provides a retention structure to keep panel 12 and panel 16 in substantially parallel position when in a compressed state of spring set 14.

Figure 4:
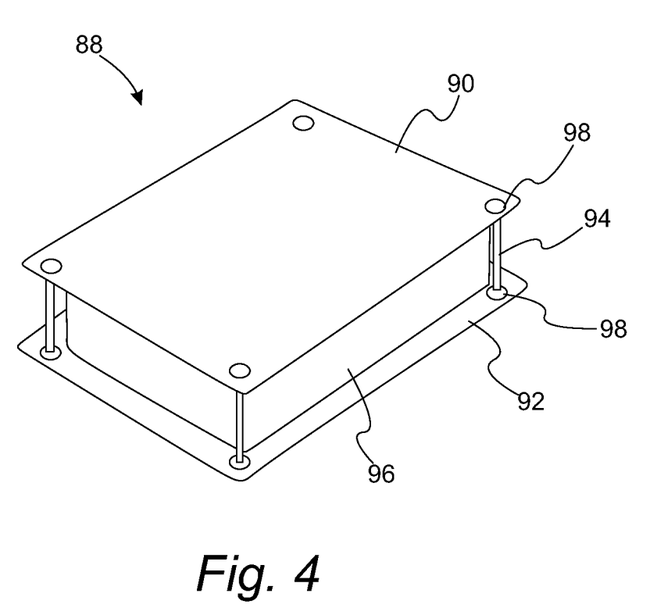
FIG. 4 schematically illustrates an alternative embodiment of a packaging component.

While threaded fasteners and snap fits are illustrated in FIGS. 2 and 4, respectively, it should be understood that any securing device capable of resisting the spring back force of a compressed load may be suitable for use in tie bar 18.

Wall 30 may be formed from a polymeric composition. The polymeric composition may include thermoplastic and/or thermoset polymers. In at least one embodiment, the polymeric composition is recyclable. Non-limiting examples of polymeric compositions suitable for wall 30 include polylactic acid and polyolefins, such as polypropylene and polyethylene.

In certain embodiments, especially when the environment for use is cold, wall 30 includes a blend of a non-polyolefin thermoplastic polymer as polyolefin, such as a thermoplastic polyolefin/polypropylene blend, a thermoplastic elastomer/polypropylene blend, a thermoplastic polymer having a glass transition temperature less than −80° C. and polyolefin blend, a thermoplastic polymer having a glass transition temperature less than −20° C. and polyolefin blend, a thermoplastic vulcanizate/polyolefin blend, and a heterogeneous polymer blend.

In certain embodiments, heterogeneous polymer blends having a crystalline thermoplastic phase and a high molecular weight and/or crosslinked elastomeric phase such as supplied by ExxonMobil or Advanced Elastomer Systems.

In at least one embodiment, in a heterogeneous polymer blend the non-polyolefin thermoplastic polymer ranges from 5 wt. % to 70 wt. % of the quantity of blend. In another embodiment, the quantity of thermoplastic polymer ranges from 10 wt. % to 40 wt. %.

In at least one embodiment, the ratio of non-polyolefin thermoplastic polymer to polyolefin ranges from 0.1 to 10 in the heterogeneous polymer blend. In another embodiment, the ratio of non-polyolefin thermoplastic polymer to polyolefin ranges from 0.2 to 5. In yet another embodiment, the ratio of non-polyolefin thermoplastic polymer to polyolefin ranges from 0.3 to 2.

The thickness of wall 30 may range from 0.03 inches to 0.5 inches after shrinkage in at least one embodiment. In another embodiment, the thickness of wall 30 may range from 0.125 inches to 0.25 inches after shrinkage. In the illustrated embodiment, the wall 30 is made of an elongated tube of polypropylene material having a wall thickness ranging from 0.14 inches to 0.17 inches before shrinkage, which is blow-molded into a shape such as the plates 12 and 16, and has a finished wall thickness ranging from 0.13 to 0.16 inches after shrinkage.

Core 34 may include expandable polymer particles such as expanded polyolefin polymer beads. In at least one embodiment, the expanded polyolefin polymer beads include expanded polypropylene polymer beads (EPP). In yet another embodiment, core 34 includes expanded high molecular weight polypropylene polymer beads. In yet another embodiment, homopolymer beads are included in the expanded polyolefin beads in order to increase the stiffness of core 34. As a non-limiting example, when the homopolymer polyolefin is a homopolymer polypropylene, the stiffness increases such that a 100,000 lbf/ft$^2$ load yields a 5.8% strain and a compression of only 0.007 inches. In another example, the strain ranges from 2% strain to 10% strain when the 100,000 lbf/ft$^2$.

In at least one embodiment, EPP may be formed in situ by injection of steam into polypropylene beads to form steam-injected expanded polypropylene beads while the wall 30 of the retainer panel 12 remains in the closed mold in order to constrain expansion of the core 34 and wall 30 during the steam expansion of the particles such as beads 36. It is understood that a portion of core 34 may comprise polyolefin beads in an unexpanded configuration or a partially expanded configuration.

While expanded polyolefin polymer beads are used in the illustration, it is understood that other expandable polymer particle compositions may be contemplated. Non-limiting examples may include, but are not limited to polyphenyloxide (PPO) and polystyrene. It is also understood that some of the particles may be partially and/or wholly pre-expanded without exceeding the scope or spirit of the contemplated embodiments.

Steam-injected expanded polypropylene may have a density ranging from 1 lb/ft$^3$ to 20 lbs/ft$^3$. In yet another embodiment, steam-injected EPP may have a density ranging from 1.5 lbs/ft$^3$ to 10 lbs/ft$^3$. In yet another embodiment, steam-injected EPP may have a density ranging from 2 lbs/ft$^3$ to 6 lbs/ft$^3$. In yet another embodiment, steam injected EPP may have a density ranging from 3 lbs/ft$^3$ to 5 lbs/ft$^3$.

In another embodiment, expanded polypropylene beads in core 34, such as supplied by JSP, Inc. as ARPRO® brand beads, have a stress-strain relation when tested according to ISO 844 using a 5 mm by 5 mm specimen at 45 g/L density of the expanded polymer particles, as shown in Table 1.

TABLE 1

| Strain (%) | Stress (MPa) |
|---|---|
| 5 | 0.18 |
| 10 | 0.20 |
| 15 | 0.22 |
| 20 | 0.23 |
| 25 | 0.25 |
| 30 | 0.26 |
| 35 | 0.28 |
| 40 | 0.30 |
| 45 | 0.32 |
| 50 | 0.34 |
| 55 | 0.38 |
| 60 | 0.42 |

TABLE 1-continued

| Strain (%) | Stress (MPa) |
|---|---|
| 65 | 0.46 |
| 70 | 0.58 |
| 75 | 0.72 |
| 80 | 0.97 |

Integrating the area under the stress-strain curve, in at least one embodiment, yields a toughness of the expandable polymer particles in core 34 exceeding 15 kJ/m³. In another embodiment, the toughness of the expandable polymer particles ranges from 20 kJ/m³ to 50 kJ/m³.

Cavity 32 is filled with expanded polyolefin particles, in at least one embodiment. The expanded polyolefin particles filling cavity 32 may have one or more density zones, such as zones 38 and 40. Particles in zone 38 may have an apparent bulk density that is less than, equal to, or greater than the density of expanded polyolefin particles in zone 40. In another embodiment, particles in zone 38 may have an apparent bulk density that is at least 1 lb/ft³ less than the density of expanded polyolefin particles in zone 40.

While FIG. 2 describes having two density zones, it is understood that retainer board 12 may have one or more density zones without exceeding the scope or spirit of the embodiment. Further, it is understood that, in certain embodiments, the density zones may comprise a relatively uniform gradient of density throughout portions of the retainer board 12 without relatively clear demarcation of one or more density zones.

In the illustrated embodiment, the apparent bulk density of the EPP beads in zone 38 is 3 lbs/ft³ while the apparent bulk density of the EPP beads in zone 40 is 5 lbs/ft³.

Polyolefin beads and methods of manufacture of unexpanded polyolefin beads suitable for making the illustrated embodiment are described in Japanese patents JP60090744, JP59210954, JP59155443, JP58213028, and U.S. Pat. No. 4,840,973, all of which are incorporated herein by reference. Non-limiting examples of expanded polyolefins are ARPLANK® and ARPRO® available from JSP, Inc. (Madison Heights, Mich.).

The expanded polypropylene in core 34, such as the JSP ARPRO® EPP, exhibits physical properties such as in Table 2.

TABLE 1

| Property | Test Method | Units | Value | | | | | |
|---|---|---|---|---|---|---|---|---|
| Density | ASTM D-3575 | lbs/ft³ | 1.0 | 2.8 | 3.7 | 4.2 | 4.6 | 5.0 |
| Compressive Strength | ASTM D-3575 | lbf/in² | | | | | | |
| @ 10% deflection | | | 8.4 | 32 | 44 | 53 | 61 | 68 |
| @ 25% deflection | | | 11 | 42 | 57 | 65 | 76 | 84 |
| @ 50% deflection | | | 19 | 54 | 73 | 84 | 97 | 112 |
| @ 75% deflection | | | 41 | 111 | 155 | 183 | 220 | 251 |
| Compressive Set | ASTM D-3575 | % | | | | | | |
| @ 25% deflection | | | 8 | 7 | 7 | 7 | 7 | 7 |
| @ 50% deflection | | | 16 | 12 | 12 | 12 | 12 | 12 |
| Compressive Creep | ASTM D-3575 | % | <0.5 | 1 | 1.5 | 2.5 | 3.0 | 3.5 |
| @ 1000 hr Service Temperature | ASTM D-3575 | °C. | 100 | 100 | 100 | 100 | 100 | 100 |

In at least one embodiment, as seen in FIG. 2, retainer board 12 includes a lip 70 designed such that a package having a retainer board 16 would nest on a second package having retainer board 12 facing retainer board 16. Lip 70 includes a protrusion 72 that is above the plane of surface 74 of wall 30. Lip 70 also includes an embossment 76 that is recessed from a planar surface 78 of wall 30.

In at least one embodiment, lip 70 has a height above planar surface 74 ranging from 0.5 inches to 6 inches.

In at least one embodiment, panel 12 has a weight ranging from 0.005 lbs. per square inch to 1.5 lbs. per square inch. In yet another embodiment, panel 12 has a weight ranging from 0.0055 lbs. per square inch to 2 lbs. per square inch.

In at least one embodiment, panel 12 may incorporate an information storage device, such as a radio frequency (RF) chip. The RF chip may provide data regarding for which the number of cycles the packaging component has been used. Such data may assist predicting panel 12 maintenance or replacement. The data may also monitor load forces and environmental exposure provided by sensors embedded in the packaging component.

Figure 3A:
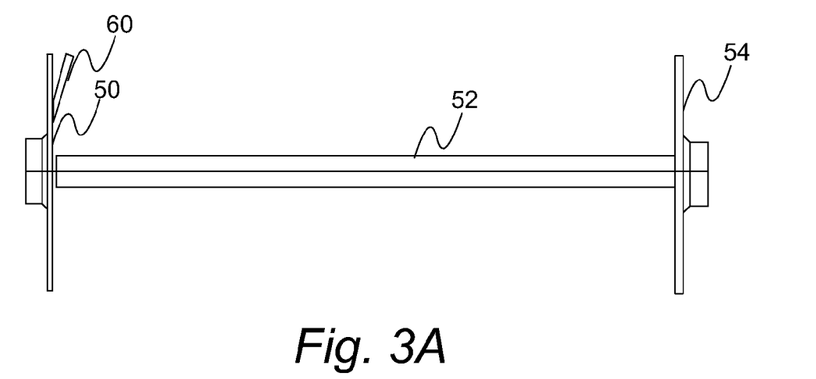
FIGS. 3a-c schematically illustrates a tie bar according to at least one embodiment.
Figure 3B:
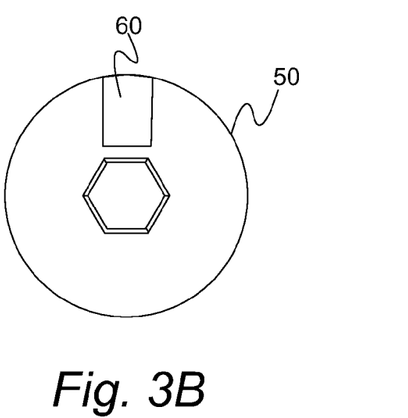
Figure 3C:
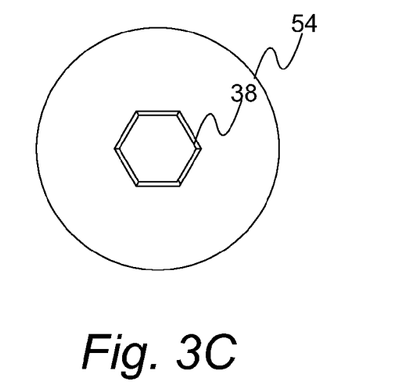

Turning to FIGS. 3a-3c, a tie bar 18 is schematically illustrated according to at least one embodiment. In at least one embodiment, fixed plate 50 includes a locking tab 60 that assists in securing plate 50 to surface 42. Plate 50 may be comprised of metal, plastic, ceramic and/or a composite. In at least one embodiment, plate 50 ranges in diameter from 2 inches to 10 inches. In yet another embodiment, plate 50 ranges in diameter from 3 inches to 7 inches.

Removable plate 54 includes nut 38 which engages shaft 52. Plate 54 may be the same diameter and composition as plate 50. In another embodiment, plate 54 may have a greater diameter or a lesser diameter and/or a different composition than plate 50.

In at least one embodiment, shaft 52 has a length ranging from 3 inches to 72 inches. In yet another embodiment, shaft 52 has a length ranging from 6 inches to 36 inches.

In at least one embodiment, shaft 52 has a diameter effective to be a compression fit when passing through aperture 44. In another embodiment, shaft 52 has a diameter that is less than the diameter of aperture 44. In yet another embodiment, shaft 52 has a diameter adapted to fit between springs 22 of spring set 14.

Turning now to FIG. 4, an alternative embodiment is schematically illustrated. Retainer board 90 is placed substantially parallel to retainer board 92 in package 88. A connector 94 is positioned outside of a compressible load 96. Compressible load 96 may be a relatively solid mass. A non-limiting example of compressible load 96 is one or more mattresses, foam buns, and/or items for warehousing.

In at least one embodiment, connector 94 includes a snap fit connection to one or more of the fixing plates 98.

Figure 5:
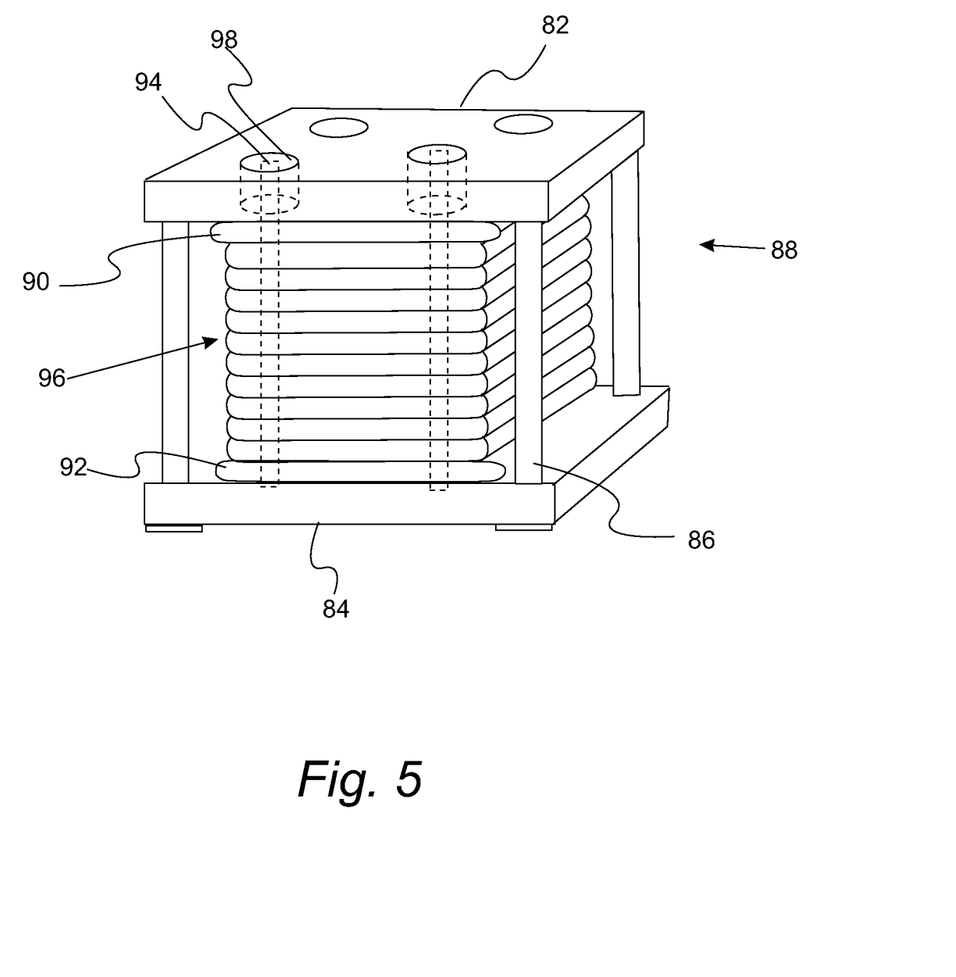
FIG. 5 schematically illustrates a bundling system according to at least one embodiment.

Turning now to FIG. 5, a bundling system 88 for a compressible material 96 is illustrated in at least one embodiment. Bundling system 88 includes a compression plate 82 which is spaced apart from a base plate 84 and connected by guide rods 86. Positioned within an area defined by the guide rods 86 is a first retainer plate 90, a second retainer plate 92, and one or more connectors 94, which pass through compression plate 82 at one or more apertures 98.

In use, compression plate 82 may compress the compressible package which includes plate 90, plate 92, and compressible material 96 using a pressurized ram (not shown) or other compressing devices known in the art.

The bundling system of FIG. 5 is illustrated in an uncompressed state. When in a compressed state, compression plate 82 is positioned closer to base plate 84 and further along guide rods 86. The compressed package is then secured by application of a securing device, such as the connector having snap fits or threaded nuts, as described previously. The compressed package can be removed by moving the compression plate 82 to an intermediate position where no pressure is applied to the compressed package. The intermediate position is understood to include the original starting position or a distance further up the guide posts and further away from base plate 84 than the original starting position.

Figure 6:
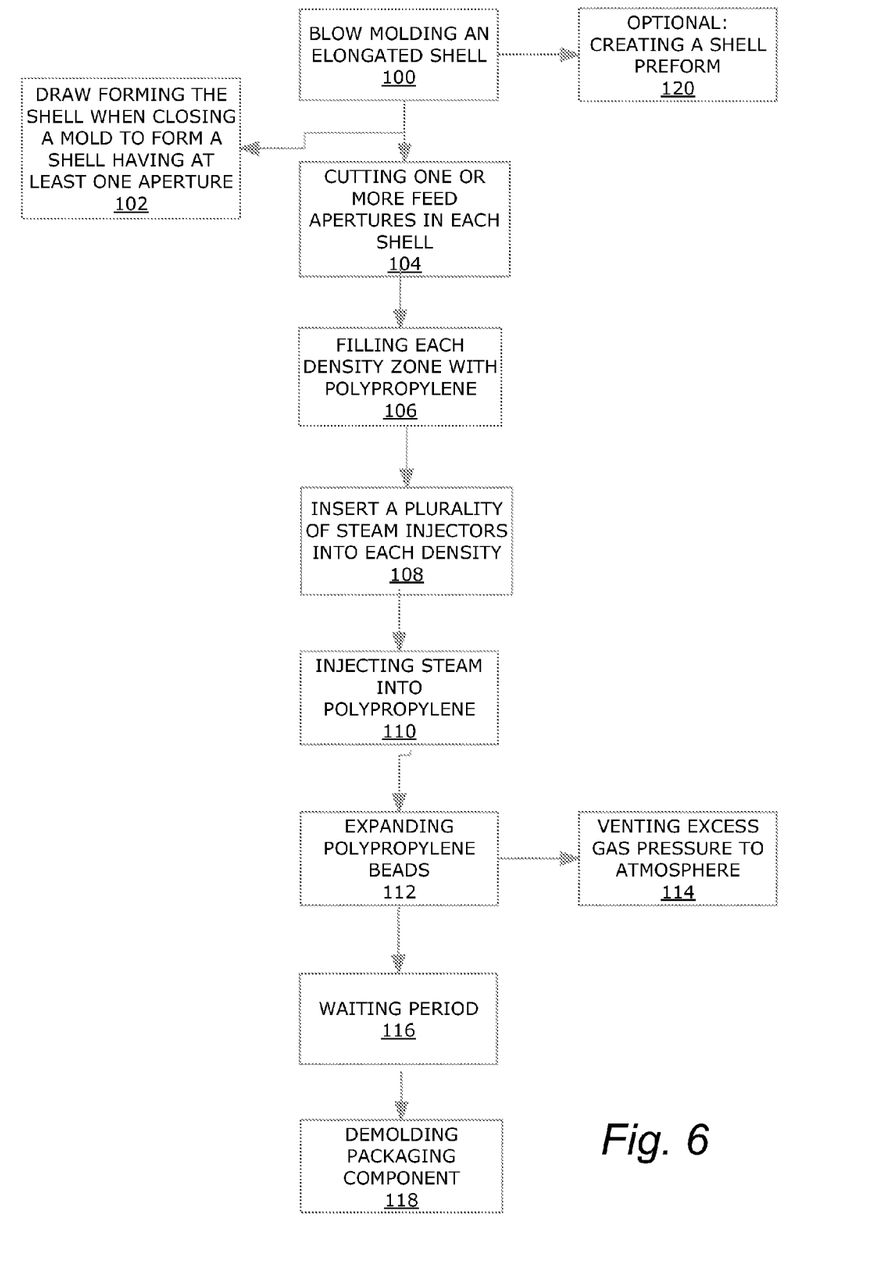
FIG. 6 diagrammatically illustrates a process flow for manufacturing a packaging component according to at least one embodiment.

FIG. 6 diagrammatically illustrates a method for manufacturing the packaging component having multiple core density zones, in at least one embodiment, which includes blowmolding a hollow elongated shell in step 100. The blowmolding operation may include, but is not limited to, an injection blowmolding operation, a stretch blowmolding operation, a 3-D blowmolding operation and/or an extrusion blowmolding operation. Optionally, the hollow elongated shell is formed from an injection molded preform in step 120.

Feed apertures, such as an inlet, and heating ports are opened, such as by cutting or piercing during step 104, into the blowmolded elongated shell of step 100. Polyolefin pellets are fed into the cavity of the elongated shell of step 100 during step 106. The polyolefin pellets in a first density zone of the elongated shell, are fed in first followed by an optional second zone in step 106. During filling of the shell with one or more density zones, the density zone position may be controlled.

Steam injection needles can be inserted during step 108 into the core including each density zone through heating ports, or, alternately, the needles can be inserted at step 106 before filling. In step 110 steam is injected at sufficient pressure effective to cause the polypropylene pellets to expand in step 112. Excess pressure is vented to the atmosphere in step 114. The packaging component is allowed to cool in step 116. The mold is opened in step 116 to release the packaging component.

In optional step 102, a form is captured in a closed mold as the molding closed on the elongated tube. The tube is expanded with heated air to form a substantially planar shell having at least one aperture. The type is provided as a perform for use with or instead of the blowmolding step 100.

Blowmolding step 100 preferably includes extruding a tubular parison. The mold is closed on the parison and gas at about 90 to 100 lbf/in$^2$ pressure is applied to the parison interior cavity. The gas injected into the parison causes the plastic to conform to the shape of the walls of the mold. One or more gas injection needles are introduced to the parison prior to, during, or after cooling the plastic on the mold walls.

Evacuation of air or other gas from within the mold cavity prior to steam injection may optionally be done, but is not required. Spacing between steam injection needles may vary with the density of unexpanded beads because the steam migration is limited. In at least one embodiment, the spacing between adjacent steam injection needles ranges from 2 inches to 6 inches. In another embodiment, the spacing between adjacent steam injection ranges from 2.5 inches to 4 inches.

It is understood that the shell may be a shape other than planar, including conformed to the package such as spring set 14, curvilinear, frustoconical, spherical, and/or combinations thereof. It should also be understood that the shell may have zero, one, or a plurality of apertures with or without embodiments.

In at least one embodiment, at approximately one half of the length of the cooling period, typically referred to as a blow cycle, feed apertures, such as fill ports, are cut. The cutting tools are withdrawn from the mold and a staged fill sequence for polyolefin pellets begins in step 204. The filling is preferably conducted from the bottom up. Upon completion of the staged fill sequence, the feed apertures are optionally closed with spin-welded plugs. The steam injection needles are injected to introduce steam for an injection time period ranging from 0.5 to 3 seconds, an injection time period sufficient to cause the bead to expand significantly. In at least one embodiment, steam is introduced as super heated steam. In another embodiment, steam is introduced at a pressure less than the clamp pressure on the mold sections. In yet another embodiment, steam is introduced in a range of 15 lbf/in$^2$ to 120 lbf/in$^2$. In at least one embodiment, the steam is introduced at 280° F. and 60 lbf/in$^2$ pressure. After a cooling time period, when post-mold expansion effectively ceases, the mold is opened to release the blowmolded package component. In at least one embodiment, the time to cool the package component such as that post mold expansion does not substantially occur ranges from about 1 minute to 8 minutes. Optionally, the mold may be vented to the atmosphere to release excess gas pressure or the mold may be burped, i.e., opened briefly and then re-closed.

Embodiments of steps 100, 104, 106, 108, and 110 are illustrated in FIGS. 7a-7d.

Figure 7A:
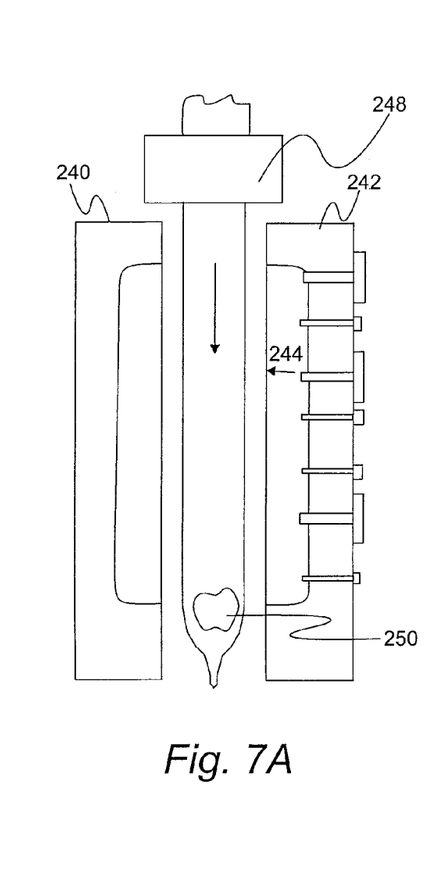
FIGS. 7a-7d schematically illustrates a processed manufacture of a packaging component according to at least one embodiment.

In FIG. 7a, blowmold sections 240 and 242 define a blowmold cavity 244 into which a molten polyolefin parison 246 is extruded from an extruder 248. Parison 246 defines an internal parison cavity 250.

It should be understood that the parison may include co-extrusion of two or more layers of differing materials using traditional and/or radial coextrusion. Other embodiments may have included the parison with a foamed material.

It should be further understood that while blowmolding is illustrated, other molding methods capable of forming a cavity defined by a shell in an enclosed mold may be used. Non-limiting examples of such molding methods include, but are not limited to, rotomolding, gas-assist injection molding, twin-sheet thermoforming, rotocasting, and methods where a preformed shell may be inserted into the enclosed mold and filled with expandable particles. For example, a plurality of filament wound pipes may be inserted into the mold cavity and be enclosed by the mold. The pipes may then be filled by the expandable pellets.

Figure 7B:
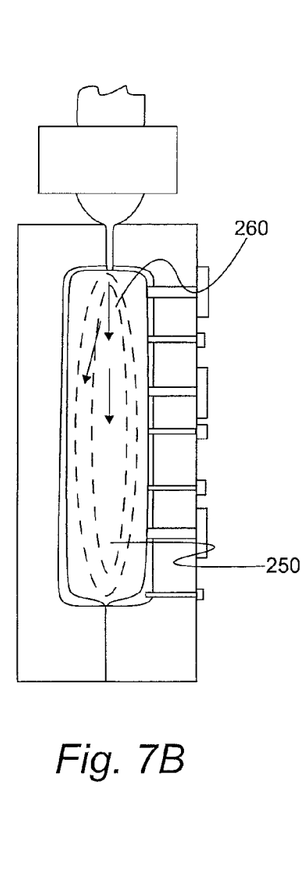

In FIG. 7b, blowmold sections 240 and 242 close upon parison 246. Gas 260 is injected into parison cavity 250 inflating the hot parison 246 while still soft and deformable to conform to the walls of the blowmold cavity 244 defining a shell 262 having a cavity 264 which may be larger than the original parison cavity 250.

Figure 7C:
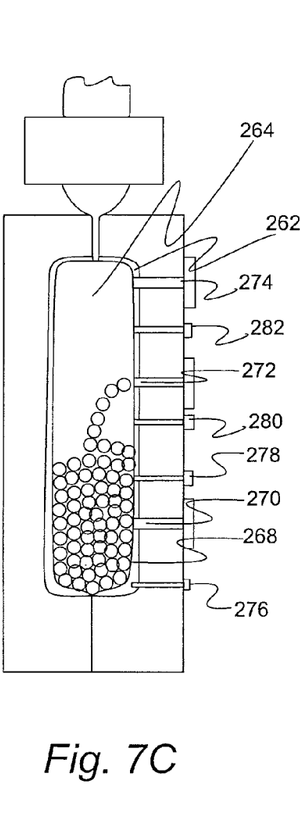

In FIG. 7c, steps 102 and 104 of FIG. 6 are illustrated as feed apertures 270, 272, and 274 are cut through shell 262. Staged filling begins as unexpanded EPP beads 268 are introduced to cavity 264 through an EPP introduction device fitted to blowmold section 242. At a first stage, EPP beads 268 are introduced through feed aperture 270. When the cavity 264 is substantially filled to the height of feed aperture 270, a second stage introduces unexpanded EPP beads 268 through aperture 272 until that portion of cavity 264 is substantially filled. A third stage introduces unexpanded EPP beads 268 through aperture 274 until the cavity 264 is filled.

An EPP introduction device (not shown) is withdrawn from apertures 270, 272, and 274. The apertures 270, 272, and 274 are plugged. Steam injection needles 276, 278, 280, 282 are inserted through blowmold section 242 and shell 262 into the filled cavity 264.

Figure 7D:
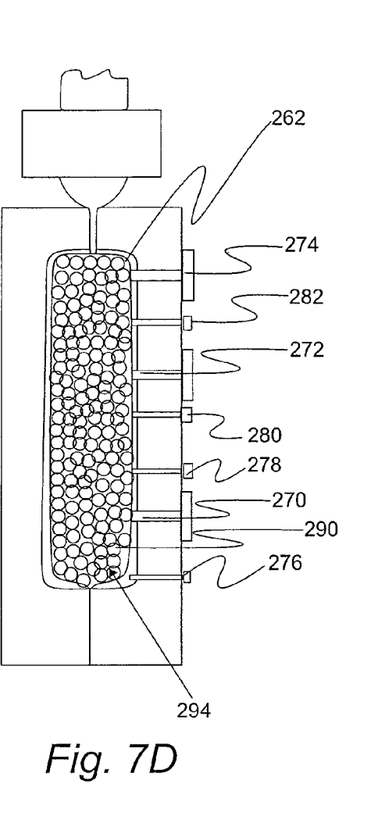

In FIG. 7*d*, steam 294 is injected through steam injection needles 276, 278, 280, 282 into unexpanded beads 268 causing the beads to expand forming a core 290 in the area that was previously cavity 264, and to bond to the shell 262.

It should be understood that other embodiments may use a heating medium other than steam without exceeding the scope of contemplated embodiments. It is further understood that the expanded polyolefin may be formed using a heating medium in cooperation with a blowing agent, such as pentane.

Figure 8:
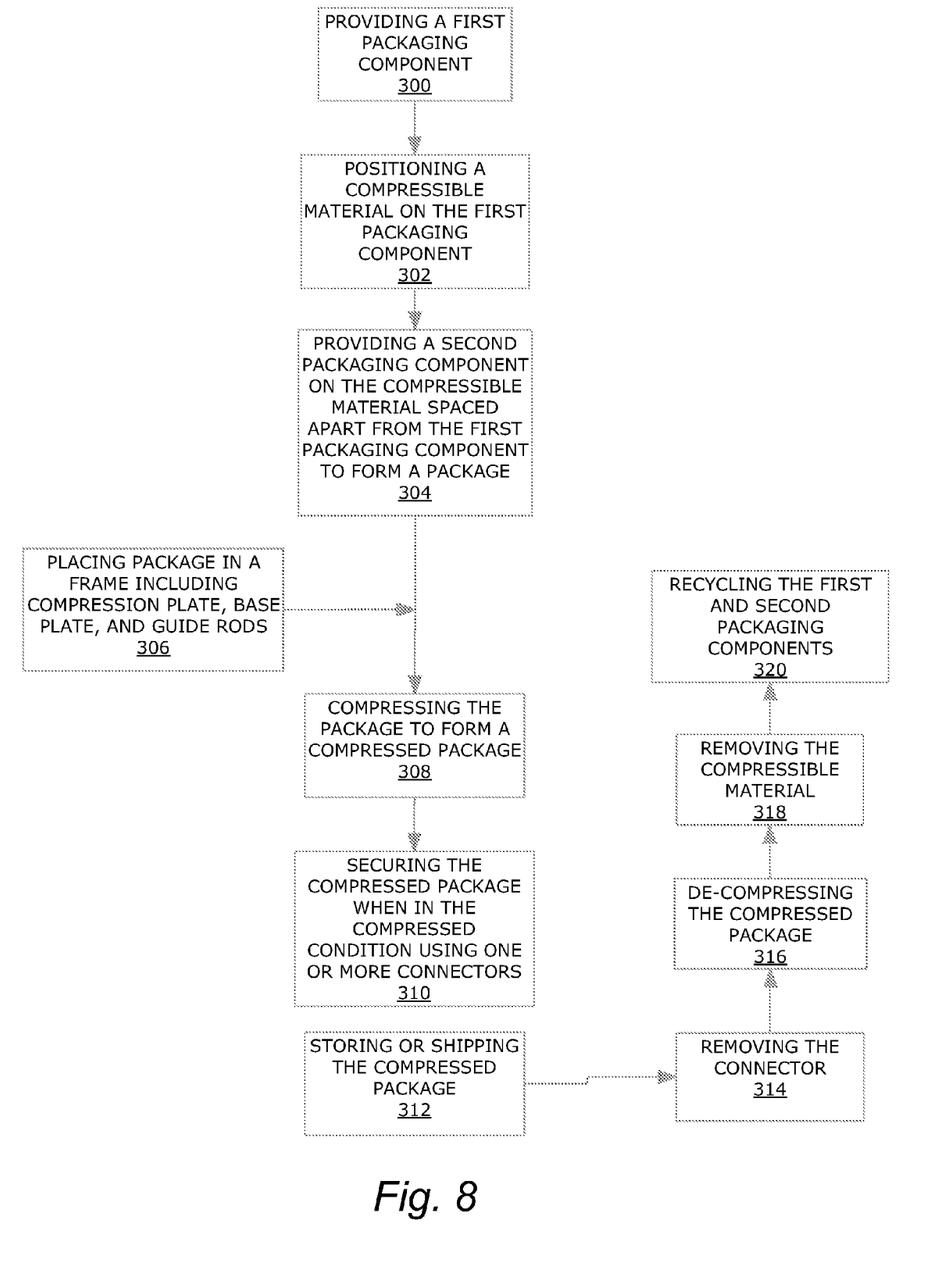
FIG. 8 diagrammatically illustrate a process flow for use in packaging a component according to at least one embodiment.

In another embodiment schematically illustrated in FIG. 8, a method for use of the packaging component such as retainer panel 12 includes a step 300 for providing a first packaging component. In step 302, a compressible material is positioned on the first packaging component.

In step 304, a second packaging component, such as retainer panel 16, is positioned on the compressible material and spaced apart from the first packaging component to form a package.

Optionally, the package may be placed in a bundling system in step 306 where the bundling system includes a frame including a compression plate, a base plate, and elongated guide rods on which the compression plate is capable of traveling.

In step 308, the package is compressed to form a compressed package.

In step 310, the compressed package is secured such that the first and second packaging component are connected by one or more connectors to retain the compressed package in the compressed condition.

In step 312, the compressed package is stored or shipped.

In step 314, the connector is removed. In at least one embodiment, the removal of the connector occurs in a bundling system in the compressed condition.

In step 316, the compressed package is decompressed allowing the first packaging component to become increasingly spaced apart from the second packaging component.

In step 318, the compressible material in a decompressed condition is removed.

In step 320, the first and second packaging components are recycled. Non-limiting examples of recycling include, but are not limited to, using the first and/or second packaging components for a new package, shredding the first and/or second packaging components into a recyclate suitable for use in forming a blowmolded shell for a new packaging component, or shredding the packaging component into a recyclate suitable for use in other plastic products.

Figure 9:
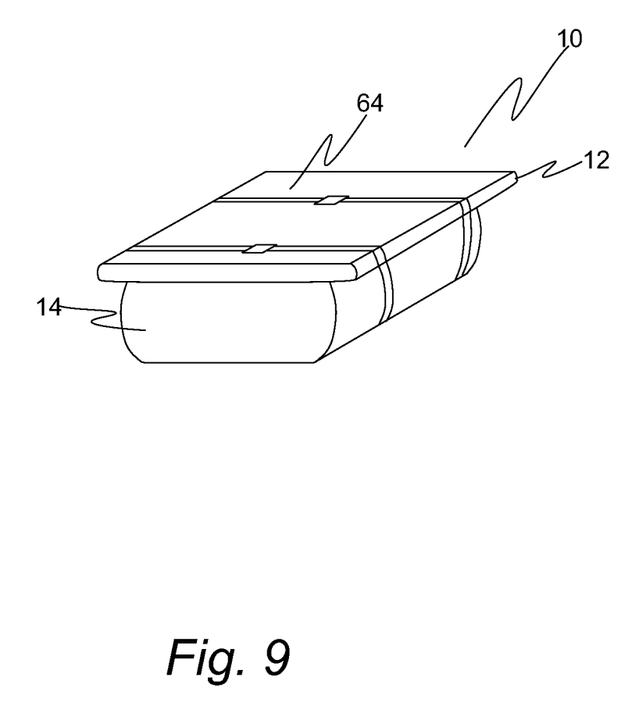
FIG. 9 schematically illustrates a package using a packaging component according to at least one embodiment.

In at least one embodiment, a method for using the packaging component such as retainer panel 12 to form a package 10 includes providing the first retainer panel 12. The first retainer panel 12 is positioned adjacent to a compressible material 14. The first retainer panel and the compressible material are compressed to form package 10 in a compressed state. The package is then secured by means known in the art, such as banding 64 as shown in FIG. 9.

It is understood that a second panel (not shown) whether a retainer panel such as panel 12 or other material such as a sheet of plywood, a brace, or an elongated board may be positioned adjacent to the compressible material and spaced apart from the first retainer panel. The second members such as the second retainer panel may cooperate with the securing device such as the banding 64.

EXAMPLE 1

A pallet of 14-15 40 inch by 40 inch in dimensions using the retainer panel having the expanded polymer particle core is able to compress a bundle of 12 king size inner spring assemblies having springs into a 100 inch high package. The springs retain a substantially linear compression configuration when 12 tie bars are used instead of the bowed condition frequently observed with prior art wire-tie method 35 wire ties.

The retainer panel weights 9.1 lbs, and may be re-used at least 6 times as many times as prior art wire-tie and lumber method.

Thirty-two of these compressed packages can be loaded aboard a 53 ft. tractor trailer van that is 100 inches wide. The compressed packages weigh only 30,000 lbs. Each bundle has a weight range from 95 to 115 lbs.

EXAMPLE 2

The retainer panel 12 of Example 1 has 9,000 lbf of uniformly deployed force applied. A finite element model test indicates that less than 5% of the retainer panel experiences a significantly different strain an average strain for the retainer panel.

EXAMPLE 3

The finite element analysis of Example 2 indicates that the base plates are 5 inch diameter discs for the tie bars are constrained in all 6 degrees of freedom.

The package component, when used as a portion of a system for packaging compressible materials, reduces the risk of injury. For example, in the mattress industry, the spring set wires no longer present a sharp wire that may cause injury. There is wood used in prior art designs. Hence there are splinters that may cause injury. The operators who are constructing compressed bundles no longer need a drill gun.

Present packaging using wood often may use three similar, but different, lengths of wood to secure the package. Extra expenses may arise because manufacturers must sort the similarly sized wood pieces and maintain relatively more stockkeeping units of the wood. Differentiation of the packaging components may be made color-coded in certain embodiments.

The package component absorbs very little or no moisture even when stored outside in the weather. In one embodiment, the package component absorbs less than 3 wt % water when soaked in water for 24 hours.

The packaging component and the tie bars have the advantage that the system is environmentally friendly. The tie bars are reusable. Only 12 tie bars are needed instead of 35 wires. There is no need for tie wire manufacturing. The retainer panels are substantially 100% melt process recyclable.

The compressed package is suitable for use with a forklift, unlike the prior art materials. The compressed bundles are also stackable improving storage and shipment.

The use of tie bars substantially reduces the side loading of the compressed package when using tie bars.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. A packaging component for use with an article, comprising:
a first panel including a first shell having a first surface facing the exterior of the packaging component relative to the article and a first opposing, spaced-apart inward-facing surface, the first shell defining a first cavity, the first panel further including a first core situated in the first cavity, wherein the first core includes a plurality of in-situ expanded polymer particles;
a second panel including a second shell having a second surface facing the exterior of the packaging component and spaced apart from and facing away from the first surface, the second shell having a second inward-facing surface opposing, spaced-apart from the second surface, the second shell defining a second cavity, the second panel further including a second core situated in the second cavity, wherein the core includes a plurality of in-situ expandable polymer particles; and
a connector including an elongated member having two ends, a first fastener, and a second fastener connectable to the ends, at least one fastener being removably connected to the end of the elongated member, the first fastener being capable of being situated in contact with the first surface and the second fastener being capable of being situated in contact with the second surface to squeeze the article therebetween when the connector is held in tension.

2. The packaging component of claim 1, wherein at least the first panel includes an aperture extending between the first surface and the first inward-facing surface, the aperture being sized large enough to allow the elongate member to pass through the aperture yet small enough to prevent the first and second fasteners to pass through.

3. The packaging component of claim 1, wherein at least one of the plates is removably connectable with the elongated member.

4. The packaging component of claim 2, wherein, the elongated member comprises a threaded rod and the plate includes a threaded nut removably connectable to threads on the threaded rod.

5. The packaging component of claim 4, wherein at least one fastener includes a detent capable of securing the fastener from rotating when the threaded rod is connected to the threaded nut during tightening of the connector.

6. The packaging component of claim 1, further comprising an embossment on the first surface adapted to coordinate with a plate such that the plate does not break the plane of the first surface when situated in the embossment.

7. The packaging component of claim 1, wherein the first panel has an embossment on one surface and a protrusion on the other surface to form a panel capable of nesting when additional panels are stacked on the first panel.

8. The packaging component of claim 1, wherein at least one core has a first density zone and a second density zone.

9. The packaging component of claim 8, wherein the density of the first density zone exceeds the density of the second zone.

10. The packaging component of claim 9, wherein the first density zone is situated between an embossment on the first surface and the opposed surface.

11. The packaging component of claim 8, wherein the density of at least one density zone ranges from 1 lbs/ft3 to 20 lbs/ft3.

12. The packaging component of claim 1, wherein the in-situ expanded polymer particles include steam-expanded polyolefin beads.

13. The packaging component of claim 1, wherein the in-situ expanded polymer particles include expanded polypropylene (EPP) beads.

14. The packaging component of claim 1, wherein the shell comprises a first layer of a blowmoldable plastic.

15. The packaging component of claim 14, wherein the shell comprises a second layer of blowmoldable plastic.

16. The packaging component of claim 1, wherein the shell comprises polypropylene.

17. A package, comprising;
the first panel of claim 1;
the second panel of claim 1;
the connector of claim 1; and
an article situated between the first and second panels, wherein at least one connector connects the first panel to the second panel.

18. The package of claim 17, wherein the article includes a box spring for a bed, a mattress, or a set of springs.

19. A packaging component for use with an article, comprising:
a first panel including a first shell defining a first cavity, the first panel further including a first core situated in the first cavity, wherein the first core includes a plurality of in-situ expanded polymer particles, wherein the apparent bulk density of the expanded polymer particles ranges from 1 lbs/ft3 to 20 lbs/ft3;
a second panel including a second shell defining a second cavity, the panel further including a second core situated in the second cavity, wherein the second core includes a plurality of in-situ expanded polymer particles, wherein the apparent bulk density of the expanded polymer particles ranges from 1 lbs/ft3 to 20 lbs/ft3; and
a plurality of connectors disposed between the first and second panels adapted for being placed in tension when providing a compressive force to an article disposed between the first and second panels.

20. The packaging component of claim 19, wherein the shell thickness ranges from 1 mm to 5 mm.

21. The packaging component of claim 19, wherein the toughness of the polymer particles exceeds 15 kJ/m3.

* * * * *

UNITED STATES PATENT AND TRADEMARK OFFICE
CERTIFICATE OF CORRECTION

| | | |
|---|---|---|
| PATENT NO. | : 8,596,027 B2 | Page 1 of 1 |
| APPLICATION NO. | : 13/005190 | |
| DATED | : December 3, 2013 | |
| INVENTOR(S) | : Richard W. Roberts et al. | |

It is certified that error appears in the above-identified patent and that said Letters Patent is hereby corrected as shown below:

In the Claims

Column 11, Line 41, Claim 4:

After "The packaging component of claim"
Delete "2" and insert -- 1 --.

Signed and Sealed this
Seventeenth Day of June, 2014

Michelle K. Lee
*Deputy Director of the United States Patent and Trademark Office*